United States Patent
Berlioz et al.

(10) Patent No.: US 6,441,751 B2
(45) Date of Patent: Aug. 27, 2002

(54) INDICATOR OF A VARIABLE FOR AIRCRAFT

(75) Inventors: Raymond Berlioz, Boulevard Charpenel; Jean-Pierre Baudry, Le Castigneau B Rue Henri Barbusse, both of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/729,354

(22) Filed: Dec. 5, 2000

(30) Foreign Application Priority Data

Dec. 7, 1999 (FR) .................................. 99 15394
Oct. 25, 2000 (FR) .................................. 00 13677

(51) Int. Cl.[7] .............................................. G01C 21/00
(52) U.S. Cl. ........................ 340/977; 340/973; 701/5; 701/14
(58) Field of Search ................... 340/977, 978, 340/963, 971, 973, 974, 975, 970; 701/4, 5, 7, 14

(56) References Cited

U.S. PATENT DOCUMENTS 5,185,606 A * 2/1993 Verbaarschot et al. ...... 340/961
5,836,546 A * 11/1998 Gast ............................ 244/182
6,112,141 A * 8/2000 Briffe et al. .................. 701/14
6,154,151 A * 11/2000 McElreath et al. ......... 340/970
6,175,315 B1 * 1/2001 Millard et al. .............. 340/959

FOREIGN PATENT DOCUMENTS

EP 0324195 7/1989
FR 2742226 6/1997

OTHER PUBLICATIONS

French Novelty Search Report, dated Sep. 1, 2000 (3 pages, in French).

* cited by examiner

Primary Examiner—Brent A. Swarthout
(74) Attorney, Agent, or Firm—Stevens, Davis, Miller & Mosher, LLP

(57) ABSTRACT

The indicator (1A) according to the invention comprises means (13) for determining first and second target values respectively of a variable and of its derivative with respect to time, and display means (5, 6, 7) which depict on a display screen (7) a means of indication (14) of the first target value, which is arranged in such a way as to indicate this first target value on a graduated scale (8), and a means of indication (16B) of the second target value which is associated at least with an indicator element (11) indicating said derivative so that, when the latter points toward said means of indication (16B), said variable of the aircraft becomes equal to and remains equal to said first target value and said derivative is equal to said second target value.

17 Claims, 7 Drawing Sheets

INDICATOR OF A VARIABLE FOR AIRCRAFT

The present invention relates to an indicator of a variable for an aircraft.

More particularly, although not exclusively, it relates to an indicator of altitude and of vertical speed (which is the derivative with respect to time of the variable representing the altitude) for an aircraft.

BACKGROUND OF THE INVENTION

It is known that for an aircraft, for example a helicopter or an airplane, when climbing (or descending), the acquisition of a given altitude, for example a flight level imposed by air control, is generally performed at a stable vertical speed.

On the approach to the intended altitude, the pilot of the aircraft progressively reduces its vertical speed so as to intercept said altitude with a vertical speed low enough to avoid any significant overshoot of the intended altitude.

This reduction in the vertical speed on approaching the intended altitude can be performed by intuition or with the help of empirical rules by monitoring the alterations (in position and in speed) of the altitude indication [needle for conventional instrumentation or index on symbology known in aeronautics by the acronym EFIS (Electronic Flight Instruments System)].

For example, a common empirical rule consists in commencing the reduction in the vertical speed on overstepping a fraction of the deviation between the intended altitude and the current altitude (1/10 for example), then in repeating this approach so as to progressively reduce the vertical speed.

Nevertheless, whatever strategy is used (intuition or with the help of an empirical rule), these methods require, on the one hand, good knowledge and good conduct of the performance of the aircraft and give rise, on the other hand, to a considerable work load in a phase of change of flight circumstance, that is to say when the pilot must devote himself to other tasks relating, for example, to air traffic or to navigation. Consequently, none of these known methods is satisfactory, the difficulties of organization and of gaging being due essentially to the fact that the standard instruments are not organized so as to depict an obvious summary of the situation.

DESCRIPTION OF THE PRIOR ART

To try to afford a solution to this problem, the documents EP-0 324 195 and FR-2 742 226 each disclose an altitude and vertical speed indicator making it possible to remedy, at least partially, the aforesaid drawbacks. To this end, the indicator disclosed by the document FR-2 742 226 comprises:
- first and second sensors of altitude and vertical speed of the aircraft, respectively;
- means for processing the signals delivered by said first and second sensors; and
- means for displaying the processed signals depicting on a display screen:
  - altitude indication means, and
  - vertical speed indication means arranged opposite said altitude indication means, said altitude indication means and said vertical speed indication means being coupled so that the altitude indication situated opposite the vertical speed indication represents, at any instant, a forthcoming altitude for the current vertical speed.

Thus, once the vertical speed indication arrives opposite the intended altitude indication, it is sufficient to keep the vertical speed indication locked onto the intended altitude indication until the latter is attained, this resulting in a progressive reduction in the vertical speed until an at least substantially zero vertical speed is reached. This known indicator consequently makes it possible to provide the pilot of the aircraft with an analog and coupled altitude and vertical speed indication, on a display screen, making it possible to guide any barometric (or radar) altitude capture without displaying the current value of the altitude of the aircraft, except when the intended altitude has actually been reached.

Moreover, in this known document FR-2 742 226, said altitude indication means consist of a graduated scale, rectilinearly (vertically) mobile past a fixed mark, and said vertical speed indication means consist of a needle mobile in rotation about the point of intersection of the extension of said fixed mark and of the extension of said needle and pointing toward said mobile scale, the angle defined by said fixed mark and said needle being representative of the value of the vertical speed.

Consequently, this known indicator enables the pilot of the aircraft to easily modulate the vertical speed so as to accurately capture and follow a desired altitude. At the moment of capture, the aircraft therefore exhibits a zero or substantially zero vertical speed.

Such a mode of interception, which is particularly advantageous for meeting up with a specified altitude or for capturing a trajectory with zero slope, cannot be applied to the interception of a trajectory exhibiting a nonzero slope since, with this known mode of interception, the aircraft captures the trajectory with a zero vertical speed, while this vertical speed ought to be such that it makes it possible to follow the trajectory (with nonzero slope) as soon as it is intercepted.

Also, to intercept a slopewise target trajectory, for example an approach trajectory, the pilot of the aircraft generally performs the following operations:
- he determines beforehand by calculation the vertical speed factor making it possible to follow the slope while taking account of the ground speed of the aircraft;
- he displays a vertical interception speed making it possible to converge toward the slopewise trajectory; and
- on the approach to the slopewise trajectory, he progressively modulates the vertical speed, on the one hand so as to intercept said trajectory without significant overshoot and, on the other hand, so as to alter his vertical speed from the interception value to the value for following (also determined beforehand by calculation).

Once the interception has been achieved, the same strategy is applied each time the aircraft exhibits a significant deviation with respect to the target trajectory.

This known method of intercepting a slopewise target trajectory thus exhibits the same drawbacks as those stated above relating to the known methods of approach, by intuition or with the help of empirical rules, to a specified altitude. In particular, it requires, on the one hand, good knowledge and good conduct of the performance of the aircraft and gives rise, on the other hand, to a considerable work load in a particular phase of flight, in which the pilot generally has to devote himself to other tasks relating, for example to air traffic or to navigation. This known method of intercepting a target trajectory exhibiting a nonzero slope is therefore scarcely satisfactory.

SUMMARY OF THE INVENTION

The object of the present invention is to remedy these drawbacks. It relates to an indicator of a variable for an aircraft, providing a pilot of the aircraft with a visual guide which is integrated into an environment which is familiar to him and which enables him to anticipate and to gage in an optimal manner the piloting of the aircraft so as to capture and follow a target trajectory.

To this end, the indicator of a variable and its derivative for an aircraft, comprising:

first means for determining the variable and its derivative with respect to time; and display means which depict on a display screen:

to indicate said variable, a graduated scale which bears values relating to said variable and which is rectilinearly mobile past a fixed mark, marking the value of said variable of said aircraft; and to indicate said derivative, an indicator element, is noteworthy in that it furthermore comprises second means for determining a first target value relating to said variable and a second target value relating to said derivative, and wherein said display means furthermore depict on said display screen:

a first means of indication of the first target value, which is arranged in such a way as to indicate said first target value on said graduated scale; and a second means of indication of the second target value, which is associated at least with said indicator element so that, when the latter points toward said second means of indication, said variable of the aircraft approaches said first target value until it is substantially equal to the latter and as appropriate remains substantially equal to said first target value, while said derivative is substantially equal to said second target value.

Thus, by virtue of the invention, to implement the desired piloting, that is to say to contrive matters so that said variable becomes substantially equal to and remains equal to its target value (first target value), it suffices for the pilot simply to control the aircraft in such a way as to keep said indicator element (derivative of the variable) pointed at said second means of indication (target value of said derivative).

Consequently, a variable is controlled by way of its derivative with respect to time.

It will be noted that the present invention is applicable for example to a horizontal plane or a vertical plane, or even to any plane.

In a first embodiment (relating to piloting in a vertical plane), said indicator is an indicator of altitude (variable) and of vertical speed (derivative).

In this case, said altitude and vertical speed indicator is noteworthy, according to the invention, in that it includes:

said first means for determining the altitude and the vertical speed of the aircraft;

said display means, which depict on the display screen:

to indicate the altitude, the graduated scale which bears altitude values and which is rectilinearly mobile past the fixed mark, marking the value of the altitude of said aircraft; and to indicate the vertical speed, said indicator element comprising a needle which is mobile in rotation about the point of intersection of the extension of said fixed mark and of the extension of said needle and which points toward said graduated scale, the angle defined by said fixed mark and said mobile needle being representative of the vertical speed of said aircraft; and said second means for determining a target altitude and a target vertical speed which correspond, respectively, to the altitude of a target trajectory and to the vertical speed making it possible to capture and as appropriate to follow said target trajectory, and wherein said display means furthermore depict on said display screen:

said first means of indication of the target altitude, which is arranged in such a way as to indicate said target altitude on said graduated scale bearing altitude values; and said second means of indication of the target vertical speed, which is associated at least with said mobile needle so that, when the latter points toward said second means of indication, said aircraft meets up with and as appropriate follows said target trajectory at said target vertical speed.

Thus, by virtue of the invention:

in order to achieve the capture of the target trajectory, it is sufficient for the pilot simply to command the aircraft in such a way as to keep said needle pointed at said second means of indication;

the altitude deviation between the actual altitude of the aircraft and the corresponding altitude of the target trajectory is displayed clearly and accurately by the relative positioning or the deviation between said fixed mark (indicating the actual altitude of the aircraft) and said first means of indication (indicating the target altitude);

the capture of the target trajectory is therefore displayed by the facing positioning (zero altitude deviation) of said fixed mark and of said first means of indication; and after capture, in order to achieve the following of the target trajectory, it is sufficient for the pilot to simply command the aircraft in such a way as to keep said needle pointed at said second means of indication.

Consequently, the indicator in accordance with the invention provides a pilot with a visual guide enabling him to pilot the aircraft optimally so as to capture and follow any target trajectory (with zero or nonzero slope).

Moreover, the elements envisaged in accordance with the invention are arranged on a known indicator, that is to say are integrated into an environment which is familiar to the pilot, thereby facilitating the understanding and the reading of the various information displayed.

Furthermore, advantageously:

said first means of indication comprises a mark which is mobile and which is provided on said graduated scale; and said display means moreover depict on said display screen a reading window, revealing a part of said graduated scale, and said first means of indication is formed in such a way as to display the numerical value of said target altitude, when said mobile mark arrives at one of the ends of said reading window.

Additionally, according to the invention, said second means of indication is symbolized on said display screen by a first straight line segment which is inclinable, the inclination of said first straight line segment being representative of the vertical speed making it possible to follow the target trajectory, and which is arranged in such a way that its direction coincides with the direction of said needle when the aircraft is situated on the target trajectory and is following it.

Moreover:

in a first embodiment, said first straight line segment is arranged on said graduated scale, so that said straight line segment and said needle are aligned at the time of capture and during the following of the target trajectory; and in a second embodiment, said first straight line segment is arranged on a vertical speed scale defined at the level of said needle, so that said straight line segment and said needle are in this case superimposed at the time of capture and during the following of the target trajectory.

Additionally, in particular to facilitate the reading of said indicator, advantageously, said display means furthermore depict on said display screen a second straight line segment joining said mobile mark (indicating the target altitude) to said first straight line segment (indicating the vertical speed making it possible to follow the target trajectory).

Furthermore, advantageously, said second means determine a target trajectory exhibiting at least two successive rectilinear portions, of different slopes, and said display means moreover depict on said display screen a visual symbol alerting a pilot of the aircraft to a future change of the current portion, to which said aircraft is guided, thereby making it possible to alert the pilot to a change of flight configuration.

Moreover, advantageously, said visual symbol, preferably a flashing disk, is arranged in such a way as to indicate the vertical speed making it possible to follow the portion of the target trajectory, which follows said change of current portion.

Furthermore, according to the invention, when said aircraft is furnished with an automatic pilot, advantageously, said automatic pilot is formed in such a way as to receive and to use the information relating to the target vertical speed so as to meet up with and follow said target trajectory automatically.

Additionally, in a second embodiment (relating to piloting in a horizontal plane, that is to say a plane exhibiting a substantially constant altitude), said variable corresponds to the speed of the aircraft, said derivative to its acceleration, said first target value to a target speed and said second target value to a target acceleration, all these parameters being defined in said horizontal plane exhibiting a substantially constant altitude.

In this case, said indicator element can comprise:
 a needle which is mobile in rotation about the point of intersection of the extension of said fixed mark and of the extension of said needle and which points toward said graduated scale, the angle defined by said fixed mark and said mobile needle being representative of the acceleration of said aircraft in said horizontal plane; or
 simply an arrow indicating the acceleration.

The elements of said first embodiment, described above, can moreover be integrated by analogy, into this second embodiment.

BRIEF DESCRIPTION OF THE DRAWINGS

The figures of the appended drawing will elucidate the manner in which the invention may be embodied. In these figures, identical references denote similar elements.

DESCRIPTION OF THE PREFERRED EMBODIMENTS

Figure 1:
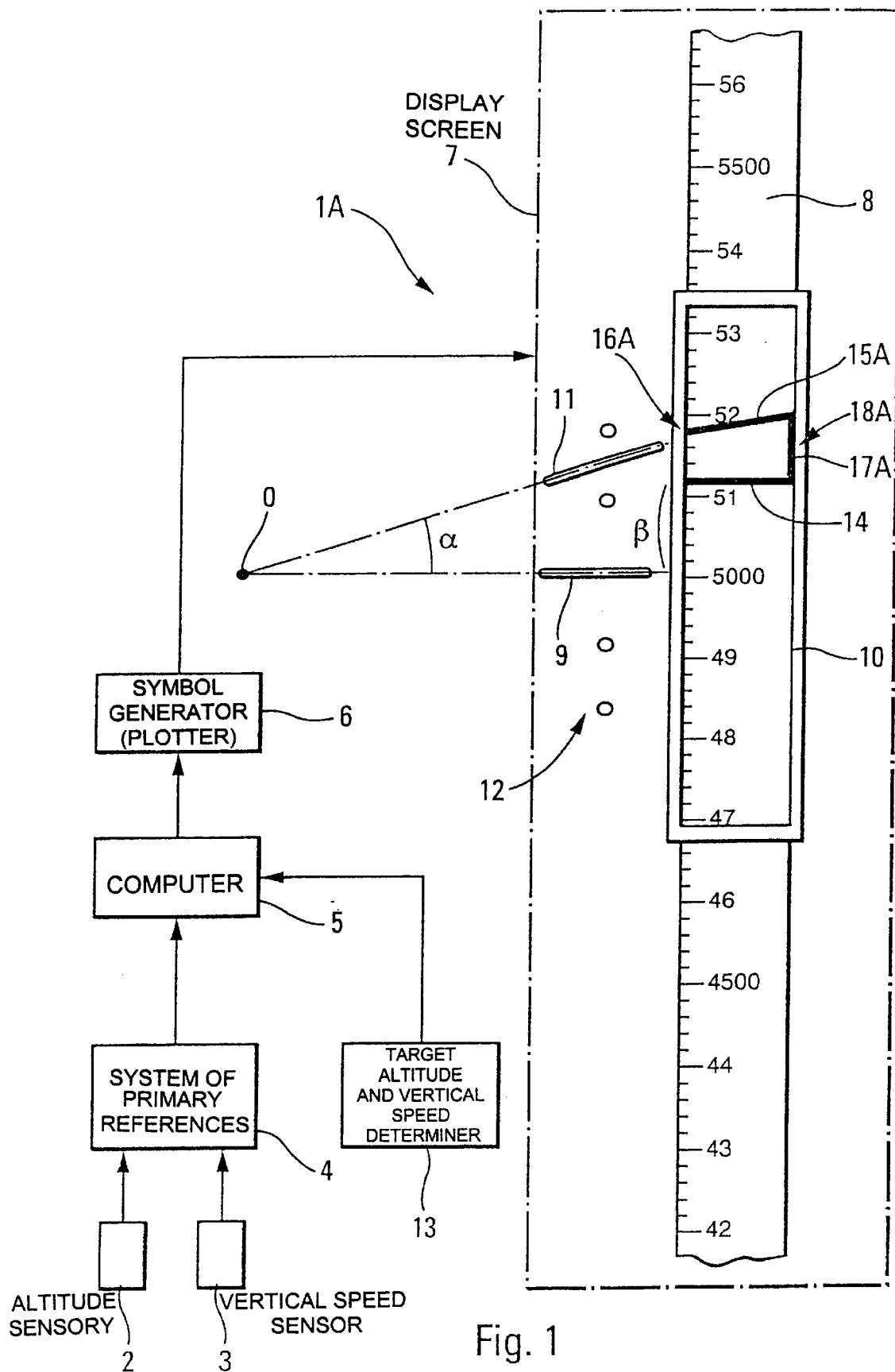
FIGS. 1 and 2 diagrammatically illustrate an exemplary indicator in accordance with the invention intended to indicate simultaneously the altitude and the vertical speed of an aircraft, respectively in first and second embodiments.
Figure 2:
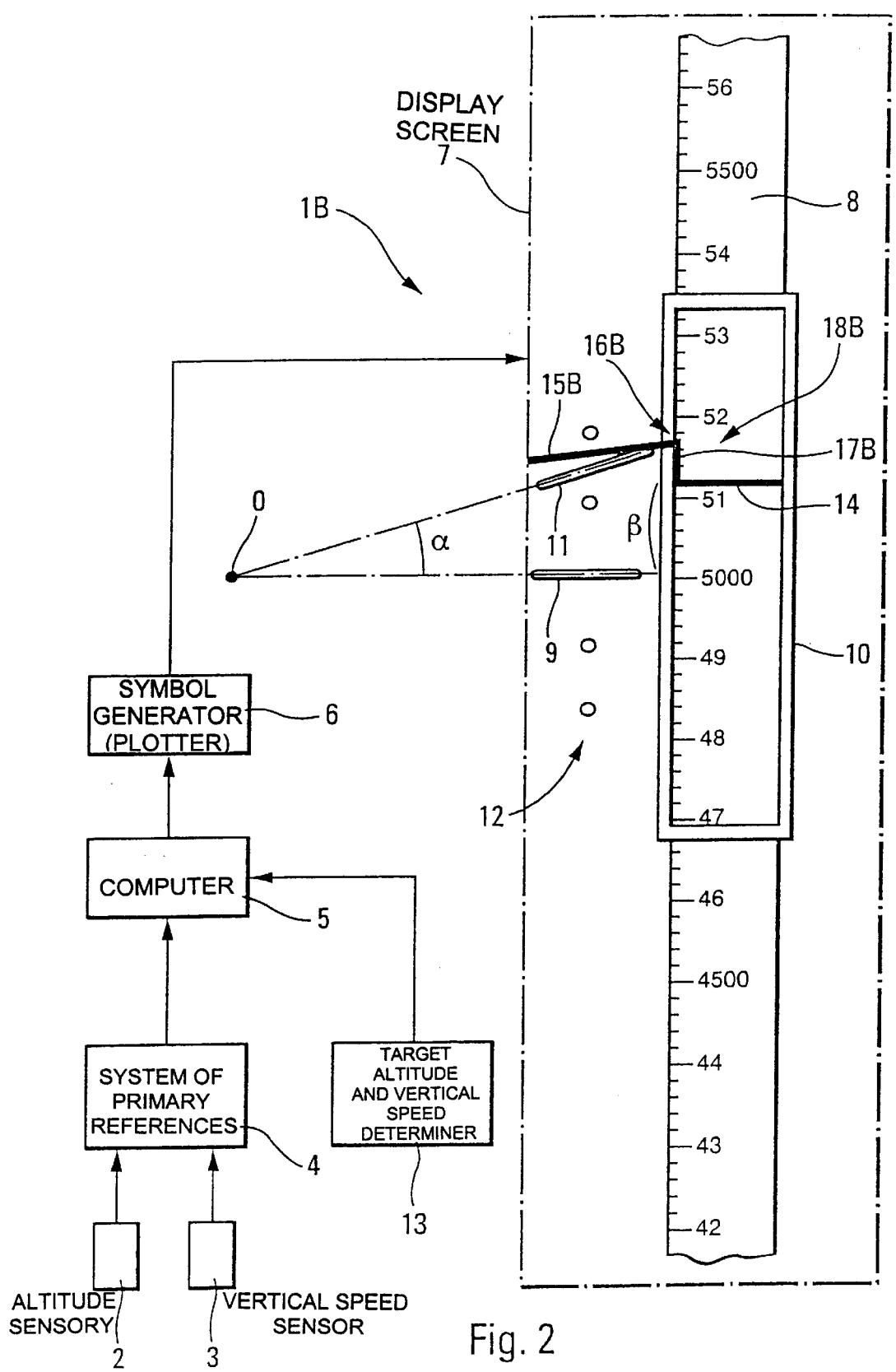

The indicator in accordance with the invention and represented diagrammatically according to two different embodiments 1A and 1B respectively in FIGS. 1 and 2, is intended in particular to indicate vertical speeds and altitudes on an aircraft, in particular a rotary-wing aircraft, such as a helicopter He.

In a known manner, said indicator 1A, 1B comprises various sensors, in particular a sensor 2 relating to altitude measurements (for example barometric, radar, GPS, DGPS, GLONASS, EGNOSS, etc.) and a sensor 3 relating to measurements of vertical speed. These sensors 2, 3 deliver their measurements by way of a system of primary references 4 and a computer 5 to a generator of symbols 6 which displays, side by side on a display screen 7, the altitude and vertical speed processed information. Of course, the sensors 2 and 3 may be of some other kind entirely.

More precisely, the system of primary references 4 delivers, by measurement of the atmospheric pressure, the altitude and vertical speed information in numerical form. It will be noted that the atmospheric pressure is associated with the barometric devices, this measurement being able, however, to relate to other types of physical quantities, if the device is no longer barometric, but of some other type (GPS for example). Additionally, the computer 5 is a digital computer ensuring the transformation of these physical data into data suitable for display on the screen. Furthermore, the symbol generator 6, or plotting machine, makes it possible to portray on the display screen 7, from the information delivered by the transformation computer 5, the graphical characteristics of the depiction of the altitude and vertical speed information.

Moreover, on the display screen 7, the altitude and vertical speed information are depicted as follows:
 the altitude indication consists of a scrolling graduated scale 8 bearing altitude values and moving rectilinearly ("vertically") past an index or fixed mark 9, the whole being displayed inside a reading window 10;
 the vertical speed indication is presented by an indicator element 11, 12 so as to be represented, on a vertical speed scale 12, by the angular rotation of a symbol in the form of a needle 11 (shown diagrammatically in particular by a straight line segment) about an axis perpendicular to the plane of the screen 7 (angle α about the point O which is the intersection of the extension of the fixed mark 9 and of the needle 11). The greater the speed of climb (descent), the greater is the upward (downward) angle of rotation α of this needle 11 with respect to said fixed mark 9 (the relation not necessarily being linear over the entire measurement span).

It will be noted that the end of the vertical speed symbol (needle 11) points toward the scrolling altitude scale 8, and the two scales 8, 12 are such that the altitude graduation situated in the extension of the vertical speed symbol represents a predicted altitude if the pilot continues to climb (or to descend). The measurement swing and the resolution of the vertical speed indication are matched to those of the altitude, so that the altitude and vertical speed symbols are coupled, thereby facilitating the acquisition of an altitude.

According to the invention, said indicator 1A, 1B for an aircraft, comprising:

first means 2, 3, 4 for determining the altitude and the vertical speed of the aircraft; and display means 5, 6, 7, moreover comprises second means 13 for determining a target altitude and a target vertical speed which correspond respectively to the altitude of a target trajectory and to the vertical speed making it possible to capture and as appropriate to follow said target trajectory.

Moreover, according to the invention, said display means 5, 6, 7 also depict on said display screen 7:

a first means 14 of indicating the target altitude, which is embodied in the form of a mobile mark arranged on the scale 8 in such a way as to indicate said target altitude on said scale 8 (bearing altitude values); and a second means 15A, 15B of indicating said target vertical speed, which is associated at least with said mobile needle 11 in such a way that, when the latter is pointing toward a specified end 16A, 16B of said second means of indication 15A, 15B, said aircraft meets up with and as appropriate follows said target trajectory at said target vertical speed.

Thus, by virtue of the invention, one obtains an altitude and vertical speed indicator 1A, 1B which is capable of providing a pilot of the aircraft with a visual guide which is integrated into an environment which is familiar to him and which enables him to anticipate and to gage in an optimal manner the piloting of the aircraft so as to capture and follow a target trajectory exhibiting a predefined slope (zero or nonzero).

According to the invention, with said indicator 1A, 1B:

to achieve the capture of the target trajectory, it is sufficient for the pilot to simply command the aircraft in such a way as to keep said needle 11 pointed at said end 16A, 16B of said second means of indication 15A, 15B;

the altitude deviation between the actual altitude of the aircraft and the corresponding altitude of the target trajectory is displayed clearly and accurately by the relative positioning or the deviation β between said fixed mark 9 (indicating the altitude of the aircraft) and said mobile mark 14 (indicating the target altitude);

the capture of the target trajectory is therefore displayed by the opposite positioning (zero altitude deviation β) of said fixed mark 9 and of said mobile mark 14; and after capture, to achieve the following of the target trajectory, it is sufficient for the pilot to simply command the aircraft in such a way as to keep said needle 11 pointed at said end 16A, 16B of said second means of indication 15A, 15B, as will be seen in greater detail hereinbelow.

It will be noted that said second aforesaid means comprise a navigation computer 13 which maintains the current position of the aircraft, with the help of navigation sensors (not represented), and determines at any moment the altitude of the target trajectory or target altitude, that is to say the altitude which the aircraft would have if it were located on said target trajectory, as well as the slope of the latter.

Moreover, knowing the slope of the target trajectory, as well as the speed Vs of the aircraft relative to the ground (which speed emanates from a Doppler sensor or is determined from the alteration in the position of the aircraft), said navigation computer 13 also determines the vertical speed which makes it possible to follow said target trajectory with said speed Vs of the aircraft relative to the ground.

Additionally, according to the invention, said second means of indication is symbolized on the display screen 7 by a straight line segment 15A, 15B which is inclinable, the inclination of said straight line segment 15A, 15B being representative of the vertical speed making it possible to follow the target trajectory, and which is arranged in such a way that its direction coincides with the direction of said needle 11 when the aircraft is situated on the target trajectory and is following it.

Figure 9A:
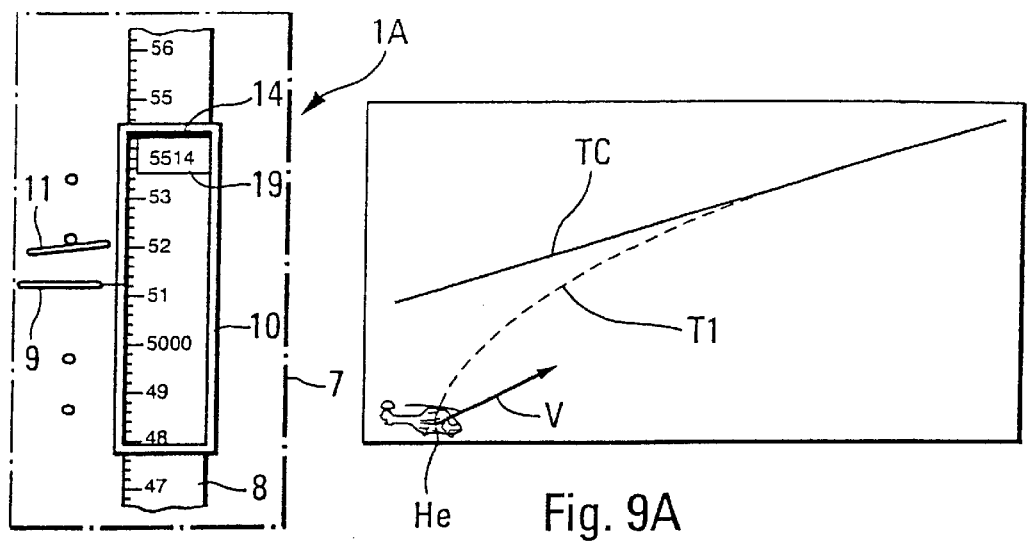
FIGS. 9A, 9B and 9C and FIGS. 10A, 10B and 10C illustrate, for an indicator in accordance with said first and second embodiments respectively, various phases leading to the capture and to the following of a slopewise target trajectory.
Figure 9B:
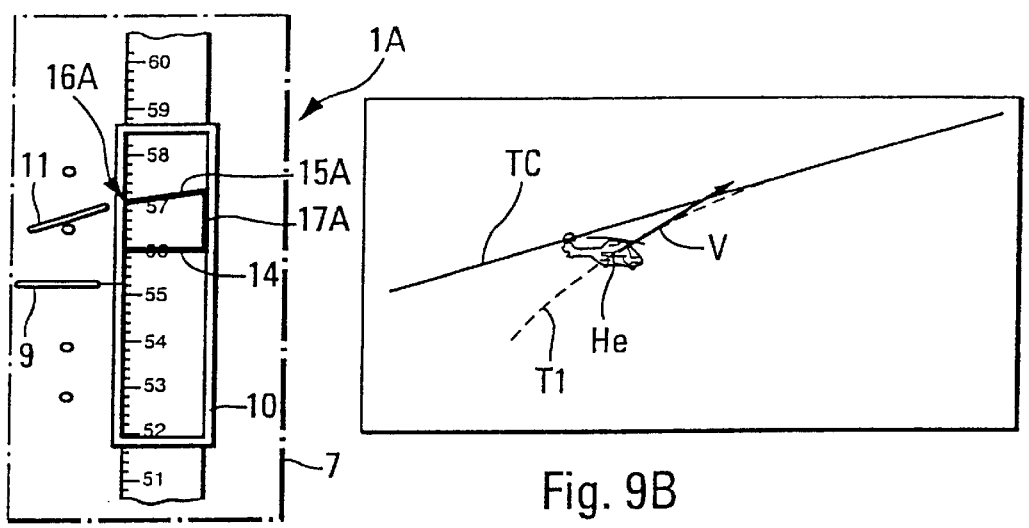
Figure 9C:
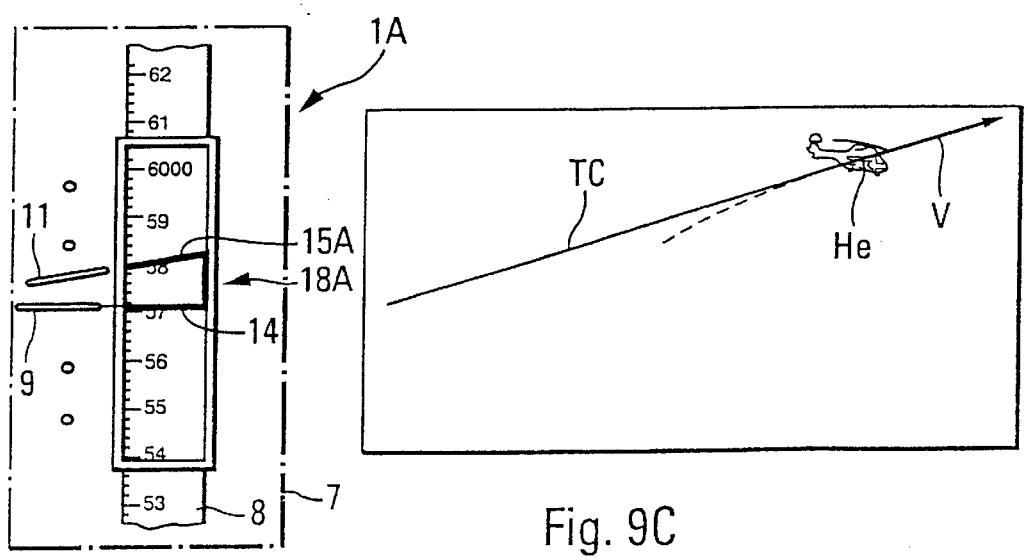

In a first embodiment represented in FIG. 1, said straight line segment 15A is arranged on the scale 8 in such a way that the needle 11 and the straight line segment 15A are aligned when the aircraft follows the target trajectory (FIG. 9C).

Figure 10A:
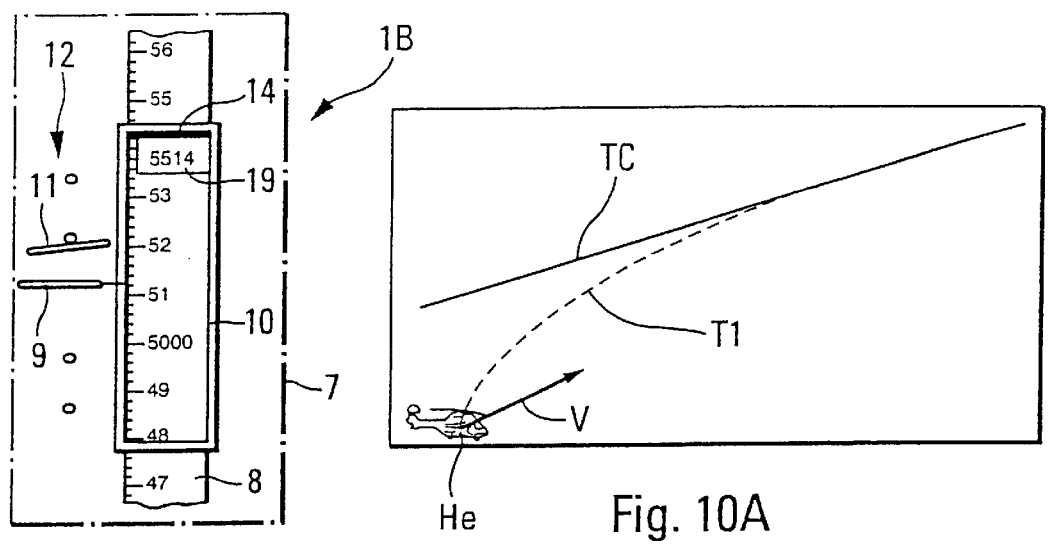
Figure 10B:
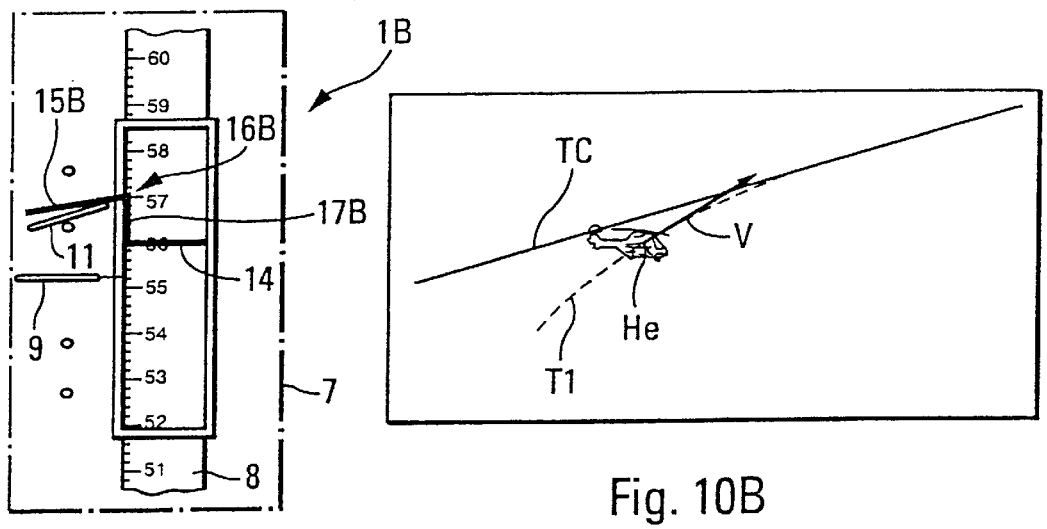
Figure 10C:
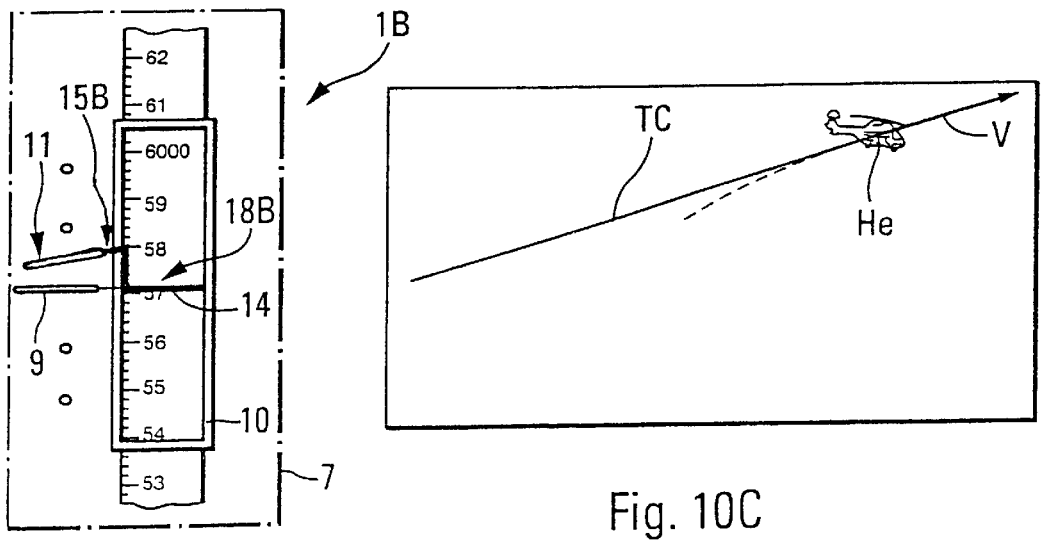

Furthermore, in a second embodiment represented in FIG. 2, said straight line segment 15B is arranged on the vertical speed scale 12 in such a way that the needle 11 is at least partially superimposed on the straight line segment 15B (or conversely as a variant) when the aircraft is following the target trajectory (FIG. 10C).

As may be seen in FIGS. 1 and 2, said display means 5, 6, 7 moreover depict on said display screen 7 a second "vertical" straight line segment 17A, 17B, joining said mobile mark 14 to said first straight line segment 15A, 15B and forming with these latter a symbol 18A, 18B, thereby facilitating the understanding and the reading of the various information items which are thus depicted by a unitary symbol 18A, 18B.

It will be noted that the information items depicted respectively by the mobile mark 14 and the straight line segment 15A, 15B are closely associated. This is because the first items make it possible to verify the deviation β with respect to the target altitude and the second items make it possible, firstly, to reduce this deviation β to zero (capture of the target trajectory) and, secondly, to keep it zero (following of the target trajectory).

Figure 3:
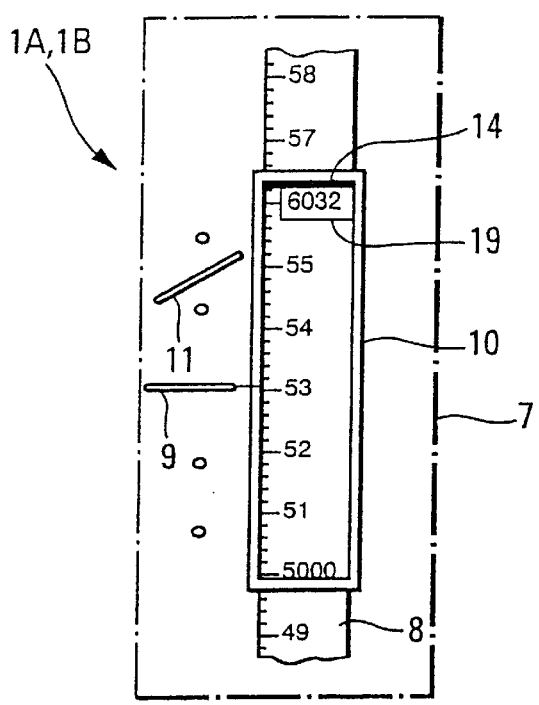
FIGS. 3 and 4 show a limit position in a reading window of a means for indicating the target altitude, respectively a top limit and a bottom limit.
Figure 4:
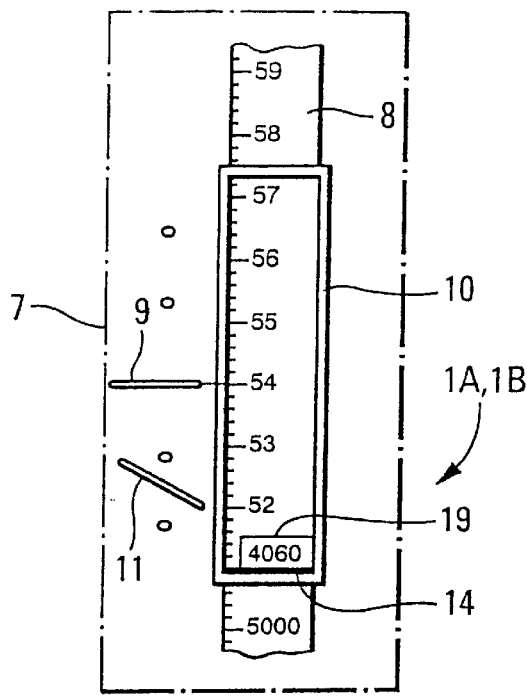

Moreover, a display element 19 is envisaged which displays the target altitude, when the mobile mark 14 abuts against an end of the reading window 10 associated with the scrolling altitude scale 8, as represented:

for a top limit in FIG. 3, the element 19 displaying an altitude of 6032 feet; and for a bottom limit in FIG. 4, the element 19 displaying an altitude of 4060 feet.

Additionally, in the case where the target trajectory comprises a plurality of successive rectilinear portions, of different slopes, the indicator 1A, 1B moreover comprises a visual symbol 20 alerting the pilot to a change of current portion, that is to say of portion with respect to which the aircraft is guided.

Figure 5:
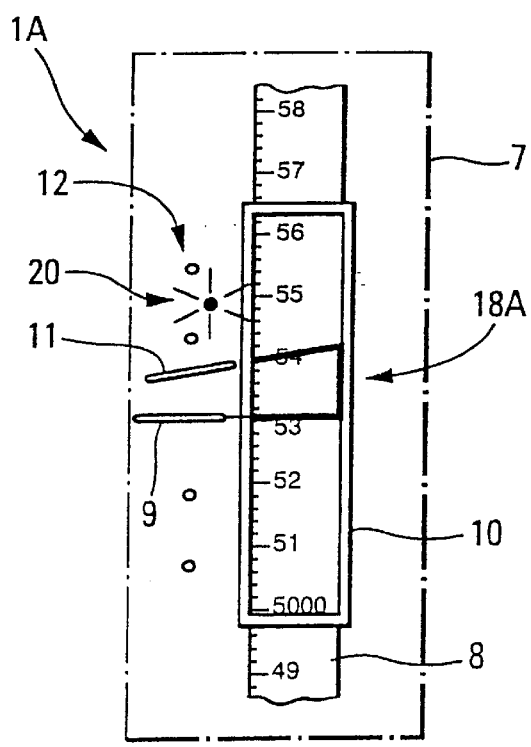
FIGS. 5 and 6 show an alerting visual symbol for warning of a change of flight configuration, on an indicator in accordance with said first and second embodiments respectively.
Figure 6:
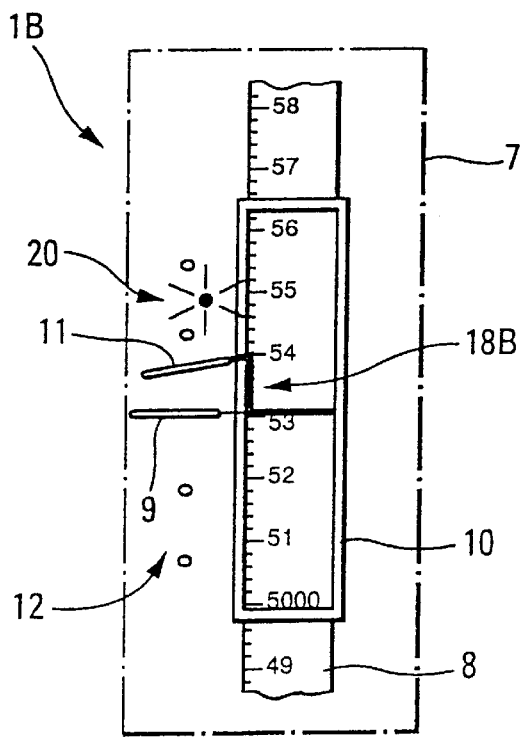

This visual symbol 20 which is preferably embodied in the form of a flashing disk and which is envisaged in FIGS. 5 and 6 respectively on the indicators 1A and 1B, in particular enables the pilot to anticipate a change of flight configuration.

According to the invention, this symbol 20 relating to the portion which follows the current portion can be displayed for the first time at various moments, in particular:

from the moment when the aircraft is piloted toward the current portion; or from the moment when the aircraft is located a predetermined distance ahead of the point of change of current portion; or with a predetermined duration, before said change of current portion.

Moreover, said symbol 20 is envisaged on the vertical speed scale 12 at a variable location which corresponds to the vertical speed making it possible to follow said portion which follows the change of current portion of the target trajectory.

As indicated earlier and set forth hereinbelow with reference to FIGS. 9B and 10B, the preferred mode of capture according to the invention consists in piloting the aircraft in such a way as to point the needle 11 toward the end 16A, 16B of the second means of indication 15A, 15B. However, within the framework of the present invention, in particular depending on the operational requirements, the pilot can also achieve capture more rapidly or more slowly, by pointing the vertical speed needle 11, as the case may be, above or below the vertical speed target (end 16A, 16B of the means of indication 15A, 15B), both for a climbing and descending target trajectory.

Figure 7:
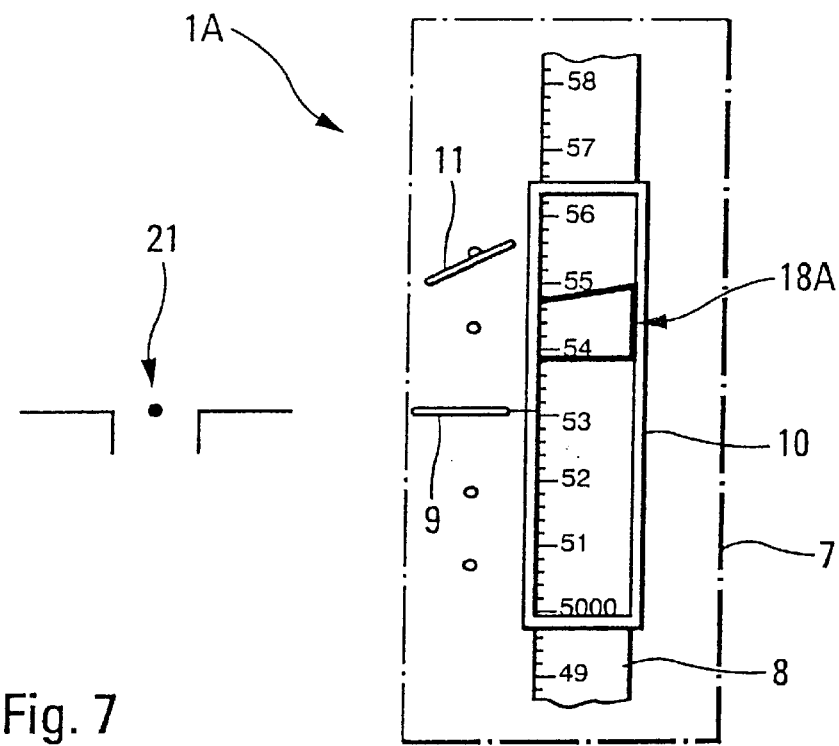
FIGS. 7 and 8 illustrate, on an indicator in accordance with said first and second embodiments respectively, a particular mode of interception or of capture.
Figure 8:
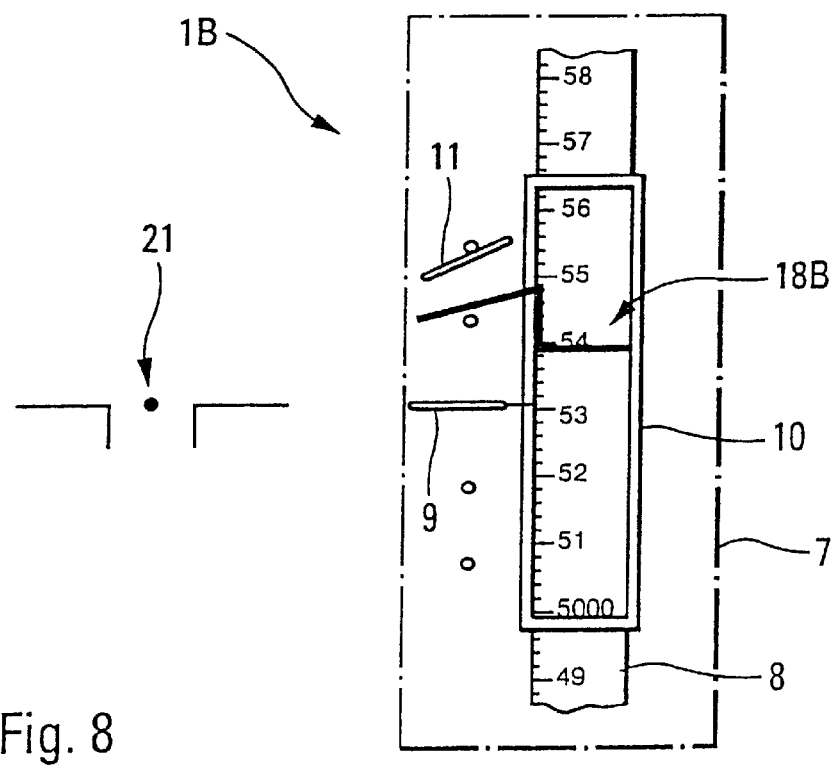

By way of example, represented in FIGS. 7 and 8 are more rapid captures or interceptions of a climbing target trajectory, for the indicators 1A and 1B respectively.

Moreover, represented in these FIGS. 7 and 8 are standard reference signals 21 making it possible to reveal a possible arrangement of the display screen 7 on a standard instrument panel screen of an aircraft.

According to the invention, the capture or the interception of a target trajectory TC, according to a theoretical capture trajectory T1 continuously reupdated by taking account of the actual position of the aircraft He, is done in three steps E1, E2, E3 specified hereinbelow, as represented:

for the indicator 1A in FIGS. 9A, 9B and 9C respectively; and for the indicator 1B in FIGS. 10A, 10B and 10C respectively.

In these figures, the right-hand part illustrates on each occasion the position of the aircraft He, in this instance a helicopter, with respect to the target trajectory TC, and the left-hand part shows the screen 7 corresponding to such a position.

During step E1, the pilot commands the aircraft He with a vertical speed illustrated in FIGS. 9A and 10A and making it possible to climb toward the target trajectory TC with positive slope. The mobile mark 14 is at the top limit in the reading window 10 so that the display element 19 displays the altitude of the target trajectory TC, in this instance 5514 feet.

During the next step E2, illustrated in FIGS. 9B and 10B, the straight line segment 15A, 15B now being visible in the window 10 subsequent to the approach to the target trajectory TC, the pilot commands the aircraft with a vertical speed such that the needle 11 is pointed toward the end 16A, 16B of the straight line segment 15A, 15B. Then, he adjusts the vertical speed in such a way as to keep this pointing. Simultaneously, the altitude deviation β is reduced, the mobile mark 14 thus approaching the fixed mark 9.

This mode of interception leads to the vertical speed of the aircraft He being brought progressively and in a damped manner to the target vertical speed, so that at the moment of interception or of capture, the needle 11 is:

aligned with the straight line segment 15A; and superimposed on the straight line segment 15B, and simultaneously the mobile mark 14 arrives opposite the fixed mark 9 (zero altitude deviation).

The aircraft He:

is then on the target trajectory TC; and exhibits a vertical speed enabling it to keep itself there.

Finally, in step E3 of tracking the captured target trajectory TC, it is sufficient to pilot the aircraft so as to keep the needle 11 aligned (or superimposed) with the straight line segment 15A (or 15B), so as to keep the aircraft He on the target trajectory TC with an appropriate vertical speed.

Of course, any upward or downward deviations in trajectory (with respect to the target trajectory TC) are corrected in an identical manner, by pointing the vertical speed needle 11 at the end 16A, 16B of the straight line segment 15A, 15B. This ensures a new capture and the tracking of the target trajectory TC.

It will be noted that, according to the invention, the pilot can alter the vertical speed in various ways: either continuously, or in the form of successive corrections (for example when the trajectory deviation overshoots a predefined value), the number and frequency of which may be modified.

Thus, since he has the possibility of continuously monitoring, directly and visually (hence in an analog manner), the trajectory T1 of the aircraft He with respect to the "ideal" target trajectory TC, the pilot can without difficulty cope with a speeding up or slowing down of the capture procedure.

It will be noted moreover that, in the case where the aircraft He comprises an automatic pilot, the modulation of the speed of interception or of capture can also be applied to said automatic pilot (concept of modulation of automata). To do this, the initial value of vertical speed displayed by the pilot must be stored as a relative value with respect to the current deviation in vertical speed and be applied up to interception of the target trajectory TC.

Figure 11:
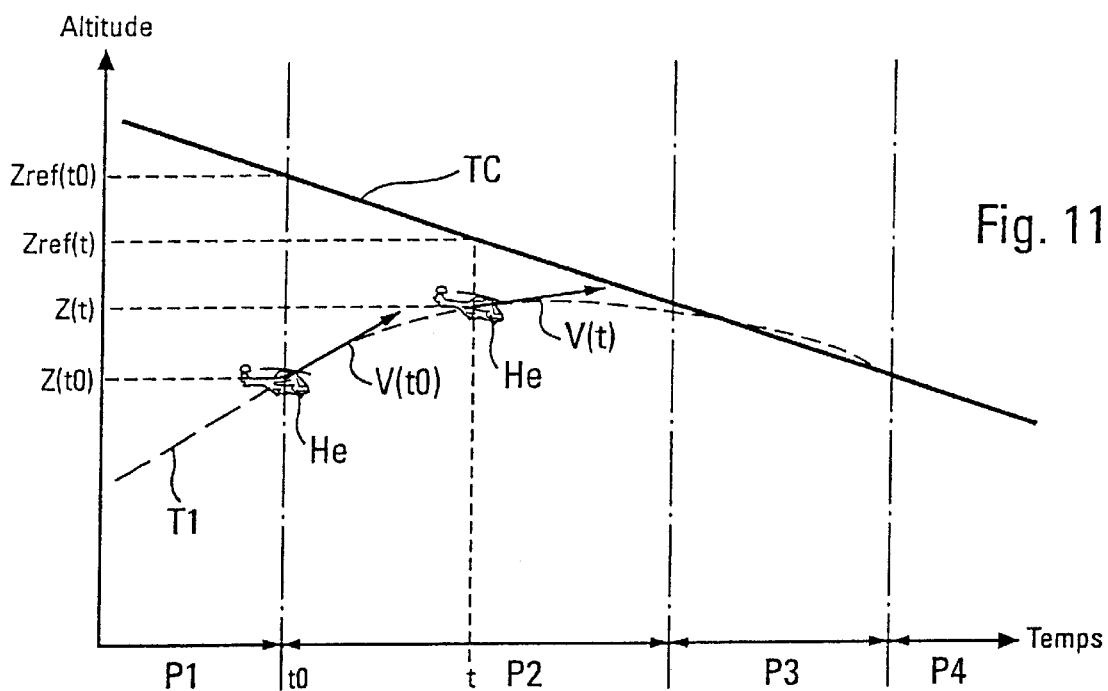
FIG. 11 is a graph showing the variation in altitude as a function of time, during the capture of a target trajectory.

To further specify the piloting implemented with the help of the present invention, there is represented, by way of example, in FIG. 11 which shows a graph illustrating the variation in altitude as a function of time, both of the target trajectory TC and of the trajectory T1 of the aircraft He, various successive phases of piloting, namely:

a first phase P1 of approaching the target trajectory TC, without implementing the present invention;

a second phase P2 of capture in accordance with the invention of said target trajectory TC, which begins at a time t0 where the altitude and the speed of the aircraft He are respectively Z(t0) and V(t0) and the target altitude is Zref(t0). It will be noted that at any time t, these various values are written Z(t), V(t) and Zref(t) respectively;

a third phase P3 of stabilization of the trajectory T1 of the aircraft He on the target trajectory TC; and a fourth and last phase P4 of following the target trajectory TC.

Figure 12:
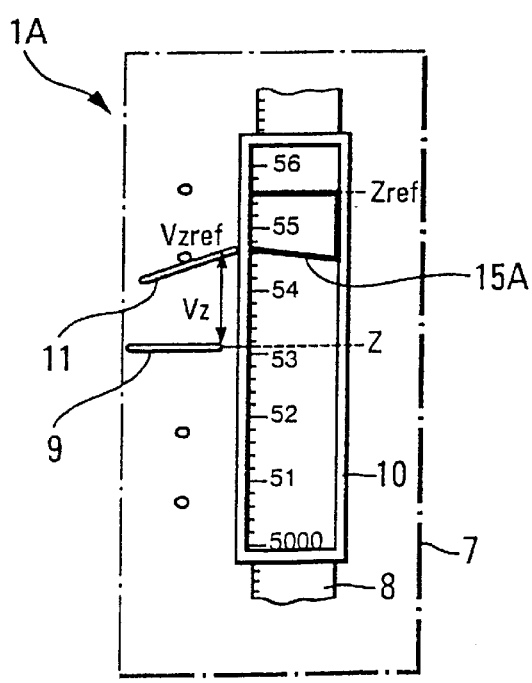
FIGS. 12 and 13 show, on an indicator in accordance with said first and second embodiments respectively, various speed and altitude values represented in FIG. 11.
Figure 13:
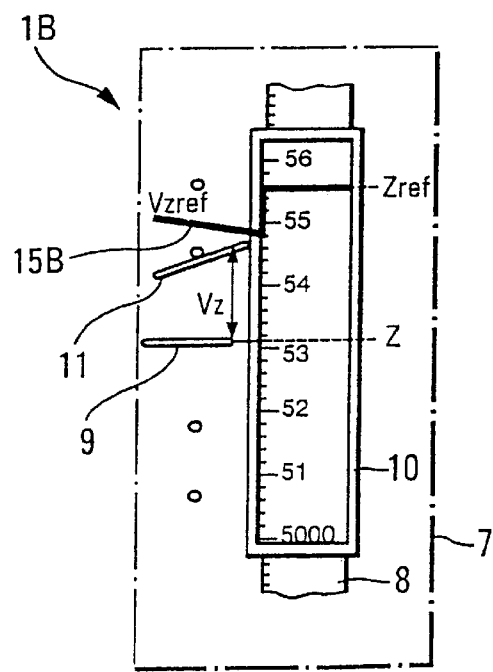

It will be noted that, during capture (phase P2), if the needle 11 (vertical speed indicator) is pointed (FIGS. 12 and 13) at the end 16A, 16B of the straight line segment 15A, 15B (target vertical speed indicator), we have, at time t, the following relation (I):

$$Vz(t) = k(Zref(t) - Z(t)) + Vzref(t) \qquad (I)$$

in which:

Vz is the vertical speed of the aircraft He (vertical component of the speed V);

Vzref is the vertical speed associated with the following of the target trajectory TC (the speed Vzref is revealed by the inclination of the straight line segment 15A, 15B);

Zref is the target altitude; and k is a constant, which is dependent on the display ratio between the vertical speed scale 12 and the altitude scale 8.

Moreover, by definition:

$$\frac{dz(t)}{dt} = Vz(t)$$

and $$\frac{dZref(t)}{dt} = Vzref(t)$$

Relation (I) can therefore be written:

$$\frac{d(Z(t)-Zref(t))}{dt} = -k(Z(t)-Zref(t))$$

or alternatively $$\frac{d(Z(t)-Zref(t))}{(Z(t)-Zref(t))} = -k\,dt$$

By integrating the above relation, we obtain:

$$ln(Z(t)-Zref(t))=-k\,t+\text{constant}$$

By taking into account the initial conditions at time t0, we obtain the relation:

$$Z(t)=Zref(t)+(Z(t0)-Zref(t0))e^{-k(t-t0)}$$

This relation conveys the convergence of the aircraft He toward the target trajectory TC (during the aforesaid phase P2), as a function of the initial deviation with respect to this trajectory (Z(t0)−Zref(t0)) and of the constant k.

The altitude and vertical speed indicator 1A, 1B described hereinabove represents merely one particular embodiment of the indicator in accordance with the invention of a variable and of its derivative with respect to time.

More precisely, the indicator in accordance with the invention includes, in a general manner:

first means 2, 3, 4 for determining the variable and its derivative with respect to time; and display means 5, 6, 7 which depict on a display screen 7:
to indicate said variable, a graduated scale 8 which bears values relating to said variable and which is rectilinearly mobile past a fixed mark 9, marking the value of said variable of said aircraft He; and
to indicate said derivative, an indicator element 11, 12; and second means 13 for determining a first target value relating to said variable and a second target value relating to said derivative.

Moreover, according to the invention, said display means 5, 6, 7 furthermore depict on said display screen 7:

a first means of indication 14, 19 of the first target value, which is arranged in such a way as to indicate said first target value on said graduated scale 8; and a second means of indication 16A, 16B of the second target value, which is associated at least with said indicator element 11 so that, when the latter points toward said second means of indication 16A, 16B, said variable of the aircraft He approaches said first target value until it is substantially equal to the latter and as appropriate remains substantially equal to said first target value, while said derivative is and remains substantially equal to said second target value.

Thus, by virtue of the invention, to implement the desired piloting, that is to say to contrive matters so that said variable becomes substantially equal to and remains equal to its target value (first target value), it suffices for the pilot simply to control the aircraft in such a way as to keep said indicator element (derivative of the variable) pointed at said second means of indication (target value of said derivative).

In another embodiment (not represented), the indicator in accordance with the invention can be intended to indicate the horizontal speed and the horizontal acceleration of the aircraft.

In this case, said variable corresponds to the horizontal speed of the aircraft, said derivative to its horizontal acceleration, said first target value to a target horizontal speed and said second target value to a target horizontal acceleration, all these elements being defined in a horizontal plane exhibiting a substantially constant altitude.

This last embodiment can include the aforesaid particular elements of said indicator 1A, 1B by adapting these latter by analogy.

Thus, by virtue of this last embodiment, the horizontal speed of the aircraft (increasing or decreasing) is controlled by way of the horizontal acceleration. Of course, acceleration is understood to mean the derivative of the speed, that is to say both an acceleration proper (increasing) and a deceleration (decreasing), according to the situation encountered.

What is claimed is:

1. An indicator of a variable and its derivative for an aircraft, comprising:

first means for determining the variable and its derivative with respect to time;

display means which depict on a display screen:

to indicate said variable, a graduated scale which bears values relating to said variable and which is rectilinearly mobile past a fixed mark, marking the value of said variable of said aircraft; and to indicate said derivative, an indicator element, second means for automatically determining at any moment a first target value relating to said variable and a second target value relating to said derivative, and wherein said display means furthermore depict on said display screen:

a first means of indication of the first target value, which is arranged in such a way as to indicate said first target value on said graduated scale; and a second means of indication of the second target value, which is associated at least with said indicator element so that, when said indicator element points toward said second means of indication, said variable of the aircraft approaches said first target value until said variable of the aircraft is substantially equal to said first target value and as appropriate remains substantially equal to said first target value, while said derivative is substantially equal to said second target value.

2. The indicator as claimed in claim 1, for indicating the altitude and the vertical speed of an aircraft, wherein it includes:

said first means for determining the altitude and the vertical speed of the aircraft;

said display means, which depict on the display screen:

to indicate the altititude, the graduated scale which bears altitude values and which is rectilinearly mobile past the fixed mark, marking the value of the altitude of said aircraft; and to indicate the vertical speed, said indicator element comprising a needle which is mobile in rotation about the point of intersection of the extension of said fixed mark and of the extension of said needle and which points toward said graduated scale, the angle defined by said fixed mark and said mobile needle being representative of the vertical speed of said aircraft; and said second means for determining a target altitude and a target vertical speed which correspond, respectively, to the altitude of a target trajectory and to the vertical speed making it possible to capture and as appropriate to follow said target trajectory, and wherein said display means furthermore depict on said display screen:

said first means of indication of the target altitude, which is arranged in such a way as to indicate said target altitude on said graduated scale bearing altitude values; and said second means of indication of the target vertical speed, which is associated at least with said mobile needle so that, when said mobile needle points toward said second means of indication, said aircraft meets up with and as appropriate follows said target trajectory at said target vertical speed.

3. The indicator as claimed in claim 2, wherein said first means of indication comprises a mobile mark which is provided on said graduated scale.

4. The indicator as claimed in claim 3, wherein said display means moreover depict on said display screen a reading window, revealing a part of said graduated scale, and wherein said first means of indication is formed in such a way as to display the numerical value of said target altitude, when said mobile mark arrives at one of the ends of said reading window.

5. The indicator as claimed in claim 2, wherein said second means of indication is symbolized on said display screen by a first straight line segment which is inclinable, the inclination of said first straight line segment being representative of the vertical speed making it possible to follow the target trajectory, and which is arranged in such a way that its direction coincides with the direction of said needle when the aircraft is situated on the target trajectory and is following it.

6. The indicator as claimed in claim 5, wherein said first staright line segement is arranged on said graduated scale.

7. The indicator as claimed in claim 5, wherein said first straight line segment is arranged on a vertical speed scale defined at the level of said needle.

8. The indicator as claimed 3, wherein said display means furthermore depict on said display screen a second straight line segment joining said mobile mark to a first straight line segment.

9. The indicator as claimed in claim 2, wherein said second means determine a target trajectory exhibiting at least two succesive rectilinear portions, of different slopes, and wherein said display means moreover depict on said display screen a visual symbol alerting a pilot of the aircraft to a future change of the current portion, to which said aircraft is guided.

10. The indicator as claimed in claim 9, wherein said visual symbol comprises a flashing disk.

11. The indicator as claimed in claim 9, wherein said visual symbol is arranged in such a way as to indicate the vertical speed making it possible to follow the portion of the target trajectory, which follows said change of current portion.

12. The indicator as claimed in claim 2, applied to an aircraft comprising an automatic pilot, wherein said automatic pilot is formed in such a way as to receive and to use the information relating to the target vertical speed so as to meet up with and follow said target trajectory automatically.

13. The indicator as claimed in claim 1, wherein said variable corresponds to the speed of the aircraft, said derivative to its acceleration, said first target value to a target speed and said second target value to a target acceleration, in a horizontal plane exhibiting a substantially constant altitude.

14. The indicator as claimed in claim 13, wherein said indicator element comprises a needle which is mobile in rotation about the point of intersection of the extension of said fixed mark and of the extension of said needle and which points toward said graduated scale, the angle defined by said fixed mark and said mobile needle being representative of the acceleration of said aircraft in said horizontal plane.

15. The indicator as claimed in claim 13, wherein said indicator element comprises an arrow indicating the acceleration of said aircraft in said horizontal plane.

16. The indicator as claimed in claim 13, wherein said first means of indication comprises a mobile mark which is provided on said graduated scale.

17. The indicator as claimed in claim 16, wherein said display means moreover depict on said display screen a reading window, revealing a part of said graduated scale, and wherein said first means of indication is formed in such a way as to display the numerical value of said target speed, when said mobile mark arrives at one of the ends of said reading window.

* * * * *